(12) United States Patent
Carpenter

(10) Patent No.: US 11,352,217 B2
(45) Date of Patent: Jun. 7, 2022

(54) RECIPROCATING MOTION SIGNATURE MONITORING AND TREND ANALYSIS SYSTEM

(71) Applicant: Siemens Logistics LLC, DFW Airport, TX (US)

(72) Inventor: Michael D. Carpenter, Arlington, TX (US)

(73) Assignee: Siemens Logistics LLC, DFW Airport, TX (US)

(*) Notice: Subject to any disclaimer, the term of this patent is extended or adjusted under 35 U.S.C. 154(b) by 0 days.

(21) Appl. No.: 17/093,751

(22) Filed: Nov. 10, 2020

(65) Prior Publication Data

US 2021/0053770 A1 Feb. 25, 2021

Related U.S. Application Data

(63) Continuation-in-part of application No. 16/592,429, filed on Oct. 3, 2019, now abandoned.

(60) Provisional application No. 62/742,693, filed on Oct. 8, 2018.

(51) Int. Cl.
*B65G 47/76* (2006.01)
*B65G 47/82* (2006.01)
*B65G 47/74* (2006.01)
*B65G 43/08* (2006.01)

(52) U.S. Cl.
CPC .......... *B65G 47/766* (2013.01); *B65G 43/08* (2013.01); *B65G 47/74* (2013.01); *B65G 47/82* (2013.01); *B65G 2201/0264* (2013.01); *B65G 2203/042* (2013.01)

(58) Field of Classification Search
CPC ........ B65G 47/74; B65G 47/82; B65G 43/08; B65G 47/766; B65G 2201/0264; B65G 47/682; B64F 1/368
USPC ..................................... 198/370.07
See application file for complete search history.

(56) References Cited

U.S. PATENT DOCUMENTS

| | | | |
|---|---|---|---|
| 2,920,738 A * | 1/1960 | Carter .................. | B65G 47/682 198/437 |
| 3,921,786 A | 11/1975 | Hejmanowski | |
| 4,980,844 A | 12/1990 | Demjanenko et al. | |
| 5,452,786 A * | 9/1995 | Gilmore ............... | B65G 47/766 198/367 |
| 7,469,780 B2 | 12/2008 | Bang | |
| 7,819,233 B2 * | 10/2010 | Van Schaijk ........ | B65G 47/766 198/370.09 |
| 7,963,385 B2 | 6/2011 | Sng et al. | |
| 8,146,730 B2 | 4/2012 | Sng et al. | |
| 8,616,361 B1 * | 12/2013 | Shankarbabu ....... | B65G 47/766 198/370.07 |
| 10,829,314 B2 * | 11/2020 | Vanigli .............. | G05B 19/4155 |
| 2002/0109010 A1 | 8/2002 | Wilz, Sr. et al. | |
| 2007/0023258 A1 * | 2/2007 | Bang ..................... | B65G 47/82 198/370.07 |

* cited by examiner

*Primary Examiner* — James R Bidwell

(57) ABSTRACT

A diverter system includes a diverter arm operated by an actuator assembly. The actuator assembly moves the diverter arm between an extended dwell position and a retracted dwell position. The position of the diverter arm is monitored by a sensor. A control system derives a motion signature of the diverter arm based on the positions of the diverter arm measured by the sensor and evaluates the motion signature of the diverter arm to identify an abnormal operation of the diverter arm.

11 Claims, 3 Drawing Sheets

RECIPROCATING MOTION SIGNATURE MONITORING AND TREND ANALYSIS SYSTEM

CROSS REFERENCE TO RELATED APPLICATIONS

This application is a continuation-in-part of U.S. application Ser. No. 16/592,429 filed 3 Oct. 2019, which claims benefit of U.S. provisional application No. 62/742,693 filed 8 Oct. 2018. The content of each the referenced applications is herein incorporated by reference in its entirety.

BACKGROUND

1. Field

Aspects of the present disclosure generally relate to a diverter system and a method for operating a diverter system. Such a diverter system is particularly suitable for use in baggage handling and parcel sortation systems.

2. Description of the Related Art

A diverter system, such as a high speed diverter, herein also referred to as HSD, is used for example for sorting baggage horizontally from a conveyor onto another conveyor. The HSD may also be used to reroute baggage in case of failure. HSDs utilize for example dual, belted arms that may be extended or retracted to cross a horizontal transport conveyor at an angle. When extended, the belted arms cause items, typically luggage within a baggage handling system, to be diverted to an adjacent conveyor. The belted arms may be said to reciprocate, or move back and forth, as they either cause items to be diverted from the horizontal belt or pass through.

The mechanism that establishes extension or retraction of the dual belted arms is driven by a motor and transmission that applies torque and power to a shaft. In an example, there is a crank on a gearmotor output shaft and cranks on each paddle (arm) mounting shaft. A difference in crank radii determines any difference in a range between dwell points at the gearmotor and at the paddles. In an exemplary configuration, when the gearmotor output shaft is rotated approximately 70 degrees back and forth, a motion is translated by the linkage to toggle the paddles in either the extended or retracted dwell positions of about 45 degrees of rotation. Of course, different crank radii and different degrees of rotation of the output shaft will provide different degrees of rotation of the paddles. Although a duty cycle on the motor is relatively low in typical applications, over time wear and damage can accumulate in the motor transmission and linkage.

Preventive maintenance for the HSD typically includes manually toggling the arms to watch and listen as they operate. Backlash in the transmission or loose couplings in the linkage cause noise and may even be visible in the motion of the arms. If this condition is not identified in preventive maintenance and repaired, a failure can occur during critical operations, causing delays and loss of productivity. Further, during operation, exceptions can occur due to the broad physical nature of baggage that may be pinched between the arms, which can damage the unit. Defective units may also exhibit motion abnormalities that affect proper operation.

SUMMARY

A first aspect of the disclosure provides a diverter system comprising a diverter arm and an actuator assembly for operating the diverter arm. The actuator assembly is configured to move the diverter arm between an extended dwell position and a retracted dwell position. The diverter system further comprises a sensor for monitoring a position of the diverter arm. The diverter system further comprises a control system configured to derive a motion signature of the diverter arm based on the positions of the diverter arm measured by the sensor, and to evaluate the motion signature of the diverter arm to identify an abnormal operation of the diverter arm.

A second aspect of the disclosure provides a method for operating a diverter system. The method comprises actuating a diverter arm to move the diverter arm between an extended dwell position and a retracted dwell position. The method further comprises monitoring a position of the diverter arm. The method further comprises deriving a motion signature of the diverter arm based on measured positions of the diverter arm. The method further comprises evaluating the motion signature of the diverter arm to identify an abnormal operation of the diverter arm.

A third aspect of the disclosure provides a diverter system comprising a diverter arm and an actuator assembly comprising a servo-controlled motor for moving the diverter arm between an extended dwell position and a retracted dwell position. The servo-controlled motor is configured to control the position of the diverter arm based on a command signal that is adjusted as a function of an error between a setpoint position and an actual position. The diverter system further comprises a control system configured to derive a motion signature of the diverter arm based on an error count over a defined interval and to evaluate the motion signature of the diverter arm to identify an abnormal operation of the diverter arm.

DETAILED DESCRIPTION

To facilitate an understanding of embodiments, principles, and features of the present disclosure, they are explained hereinafter with reference to implementation in illustrative embodiments. In particular, they are described in the context of being a diverter system and a method for operating a diverter system. Embodiments of the present disclosure, however, are not limited to use in the described systems or methods.

The components and materials described hereinafter as making up the various embodiments are intended to be illustrative and not restrictive. Many suitable components and materials that would perform the same or a similar function as the materials described herein are intended to be embraced within the scope of embodiments of the present disclosure.

Figure 1:
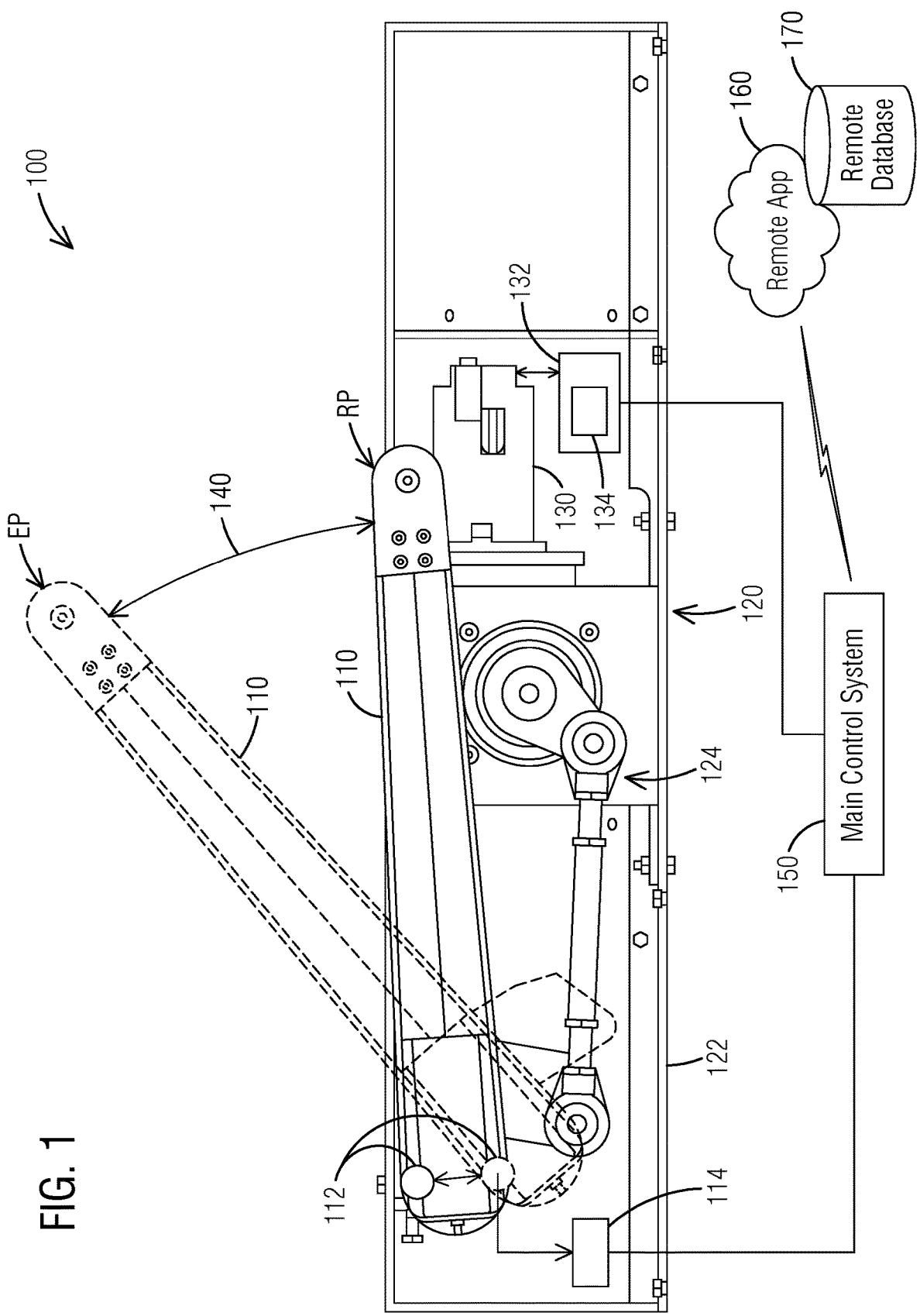
FIG. 1 illustrates a plan view of a diverter system in accordance with a first embodiment of the present disclosure.

FIG. 1 illustrates a plan view of a diverter system 100 in accordance with a first embodiment of the present disclosure. The diverter system 100 comprises a diverter arm 110 (also known as a paddle) and an actuator assembly 120 for operating and moving the diverter arm 110. The actuator assembly 120 is configured to move the diverter arm 110 between a retracted dwell position RP (also known as home position) and at least one extended dwell position EP (also known as diverting position). Movement of the diverting arm 110 is illustrated by path 140.

The diverter system 100 can be used within baggage handling systems, for example at airports, parcel handling systems within mail processing facilities, or many other handling systems including for example automated sortation systems etc. In an embodiment, the diverter system 100 is configured as high-speed diverter system.

The diverter system 100 of FIG. 1 illustrates one diverter arm 110, but it should be noted that the diverter system 100 can comprise multiple diverter arms 110, located at different positions within the diverter system 100. For example, the diverter system 100 can comprise dual belted arms 110, the arms 110 being essentially arranged opposite each other.

In an embodiment, the actuator assembly 120, which operates the diverting arm 110, is housed in enclosure 122 and comprises a gearmotor 130 and a drive 132. The drive 132 is only illustrated schematically and may be integrated in the gearmotor 130 or may be a separate component. The gearmotor 130 is operably coupled to the diverter arm 110, and the drive 132 is configured to power and control the gearmotor 130. The gearmotor 130 comprises a plurality of stages, wherein an output stage functions as a shaft for turning or moving the diverting arm 110 from position RP to extended dwell position EP.

The diverter arm 110 is pivotally mounted for example adjacent a conveyor or other transporting means, such as a transporting belt. For diverting articles or objects, the diverter arm 110 is moved from the retracted dwell position RP to an extended dwell position EP, wherein the arm 110 moves across a surface of the conveyor or transporting means to divert objects or articles travelling on the surface in a diverting direction. For example, the diverting arm 110 is moved along path 140 up to a specific angle between RP and EP, for example an angle of about between 40° and 50°.

In an embodiment, the gearmotor 130 comprises a servo motor, and the drive 132 comprises a variable frequency drive (VFD) or a servo drive, operably coupled to the servo motor and powering and controlling the servo motor. The drive 132 can be integrated in the gearmotor 130 and generally provides speed adjustments, for example for belts or other means that operate or move the diverting arm(s) 110.

In an example, the actuator assembly 120, specifically the drive 132, comprises a controller 134, such as a servo controller, configured to adjust speeds of the gearmotor 130 and thereby moving the stages (gears) of the gearmotor 130 and moving the diverting arm 110.

Although a duty cycle on the gearmotor 130 is relatively low in typical applications, over time wear and damage can accumulate in the motor transmission and linkage. Preventive maintenance typically includes manually toggling the arms 110 to watch and listen as they operate. Backlash in the transmission or loose couplings in the linkage cause noise and may even be visible in the motion of the arms 110. If this condition is not identified in preventive maintenance and repaired, a failure can occur during critical operations, causing delays and loss of productivity.

Thus, in accordance with an exemplary embodiment of the present disclosure, the diverter system 100 comprises a position sensor 112 for monitoring a position of the diverter arm 110. Further, a control unit 114 is operably coupled to the position sensor 112 and configured to derive a motion signature of the diverter arm 110 based on the positions of the diverter arm 110 measured by the position sensor 112. A motion signature of the diverter arm 110 is derivative of a motion sequence or course of movement from the retracted position RP to the extended position EP along path 140. Subsequent use of the equipment, e.g. the diverter arm 110 or the linkage, e.g. components of the actuator assembly 120, in operation allows a motion signature to be observed, in reference to control signals that identify start and completion of a signature, wherein resulting motion signatures can be evaluated in different ways.

The control unit 114 is configured to evaluate the motion signature of the diverter arm 110 to identify an abnormal operation of the diverter arm 110. An abnormal operation refers to a harmful exception in the course of normal operation. An abnormal operation of the diverter arm 110 may result, for example, from regular wear, backlash, loose couplings in the linkage, etc.

The control unit 114 can be configured as local controller, for example an embedded microcontroller. The control unit 114 can be integrated or incorporated in an existing overall control system, which may also include, for example, control unit 134 of drive 132. In another example, the control unit 114 may be separate component. The control unit 114 can be software or a combination of software and hardware. For example, the control unit 114 can be programmed into existing equipment, for example as software module into drive control unit 134 or other control and monitoring equipment of the diverter system 100.

The diverter system 100 or local control unit 114 can further comprise an analog-digital converter for converting a monitored/recorded motion signature (analog signal) into a digital signal of the motion signature, so that the digital motion signature can then be evaluated and compared to the previously stored digital reference signature.

The control unit 114 is configured to compare the actual motion signature of the diverter arm 110, when in operation, to a previously stored reference signature of a reference diverter arm. A reference (motion) signature is or describes a motion sequence of a correctly operating diverter arm without any malfunctions or wear.

Motion signatures or spectra can be created using various algorithmic means, including for example Fast Fourier Transformation (FFT) and various wave-based approaches.

In an example, a comparison of the motion signature of the diverter arm 110 with the reference signature comprises determining a degree of difference between the signatures. For example, a degree of difference can be determined between the dwell positions RP and EP and reference dwell positions of the reference signature. The motion signature of the diverter arm 110 may describe a range or angle between dwell positions RP and EP of 43°, wherein the optimal reference signature comprises a range or angle between optimal dwell positions of 45°. Thus, the difference would be 2°. The diverter system 100 is still functioning, but a maintenance condition may be identified prior to malfunction or failure of the diverter system 100.

The evaluation method of comparing the motion signature with the reference signatures is a means of recording and measuring wear in the system 100, or of determining that linkage is otherwise becoming loose. When the difference between the two spectra exceeds established parameters, a technician or maintenance personnel is notified. Early detection and resolution of these conditions allows them to be dealt with outside of operational schedules.

In another embodiment, the control unit 114 is configured to compare the motion signature of the diverter arm 110 to one or more fixed thresholds. The evaluation method of comparing the motion signature to fixed threshold(s) involves monitoring to identify instances in which a rate of change, or "jerk" exceeds established parameters, which is thought to be indicative of a malfunction or of an item exceeding specification(s) being processed. Such fixed thresholds include for example motion parameters such as speed of the diverting arm 110, or angle of the moving arm 110 when in dwell positions RP, EP. Further, parameters may include timing of the divert operation according to contact of items on the arm(s) 110 after the arm(s) 110 have activated. Incorrect parameters can be slow speed, incorrect angle/range or incorrect timing with respect to the diverting arm 110.

In an embodiment, the position sensor 112 comprises at least one accelerometer or accelerometer sensors, for example a 3-dimensional accelerometer. An accelerometer measures acceleration due to movement and gravity. An accelerometer can be used to measure or track positions of a component, such as the diverting arm 110. The accelerometer will not be described in detail herein as those skilled in the art are familiar with position sensors and accelerometers.

The position sensor 112 comprising the at least one accelerometer may be affixed in at least one axis of the diverter arm 110. It should be noted that the diverter arm 110 may comprise more than one position sensor 112, such as accelerometers, for example two or three positions sensors mounted at different locations of the diverter arm 110.

As noted, the diverter system 100 can comprise multiple diverter arms 110 and thus multiple position sensors 112, embodied as accelerometers, wherein each diverter arm 110 can comprise one or more position sensors 112. In this case, the local control unit 114 is operably and communicatively coupled to the multiple position sensors 112.

In the shown example, the overall control system further incorporates a main control system 150 which controls the overall operation of the diverter system (e.g., which bags or parcels are to be diverted, whether the diverter arm 110 is to be diverted or not as they approach the diverter area on the conveyor, etc.). The main control system 150 may comprise, for example, a programmable logic controller (PLC). The local control unit 114 is communicatively coupled to the main control system 150, wherein the control unit 114 is further configured to communicate evaluated motion signatures of the diverter arm 110 to the main control system 150. The main control system 150 can be configured to provide or output a signal or message with respect to a condition of the diverter arm 110, such as for example that maintenance or repair is required based on evaluated motion signature(s) of the diverter arm 110. Such a signal or message can be for example displayed on a screen or a display to an operator, technician or maintenance personnel.

In another configuration, the main control system 150 is configured to communicate, wirelessly, the evaluated motion signatures to a remote cloud-based application 160 and/or a remote database 170 for further processing, such as remote technical support, for example recommendations as to maintenance service or automatic ordering of parts that need replacement. Storing and analyzing the motion signatures or spectra (remotely or otherwise), particularly comparing the spectra from many different diverter systems 100, and correlating conditions and events that have correlated to particular patterns in the spectra offers potential to associate trends with very specific likely outcomes.

Figure 2:
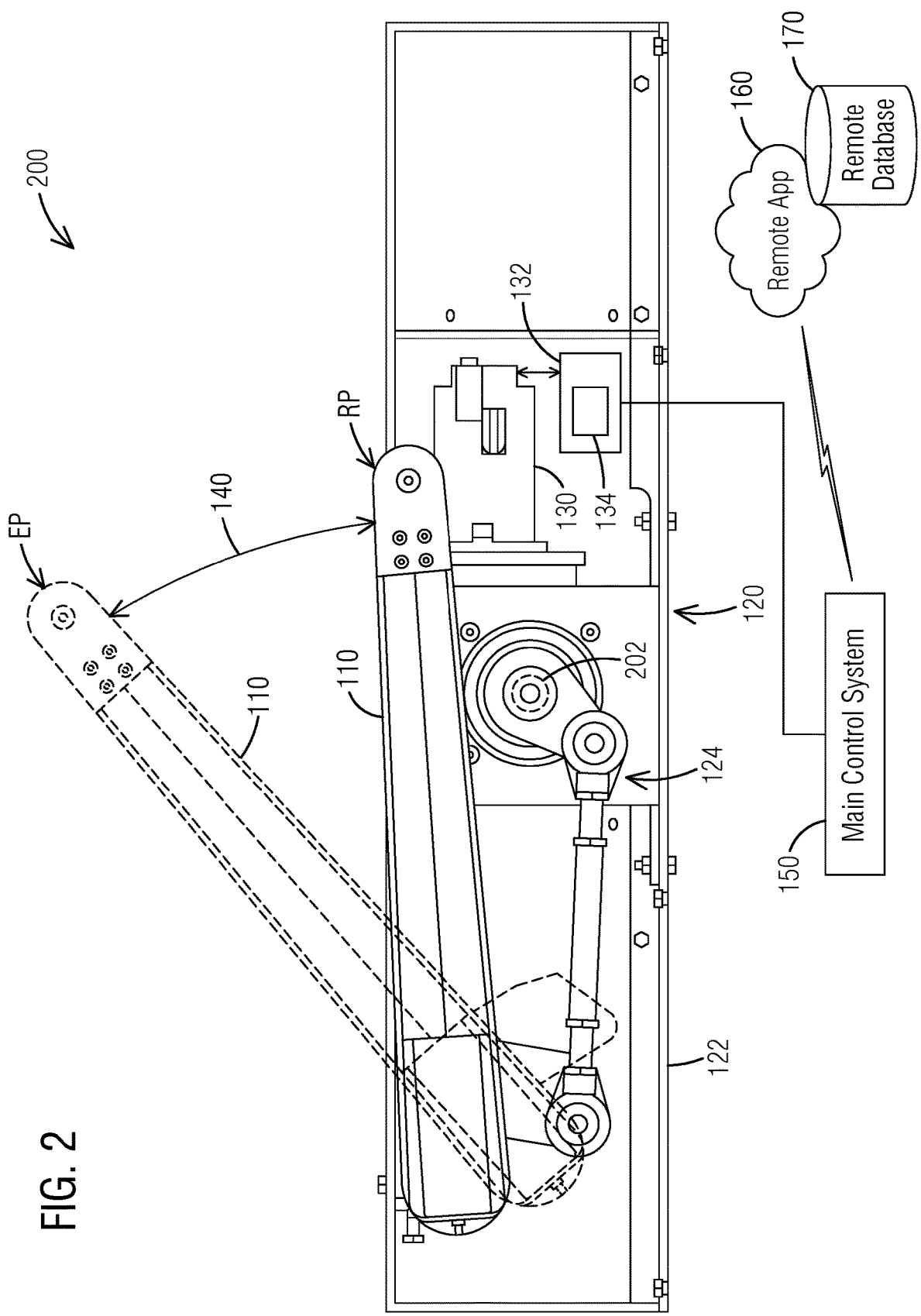
FIG. 2 illustrates a plan view of a diverter system in accordance with a second embodiment of the present disclosure.

FIG. 2 illustrates a diverter system 200 in accordance with a second embodiment of the present disclosure. In FIG. 2, reference numerals for like elements have been retained from FIG. 1 to avoid repetitive description. In this embodiment, the diverter system 200 leverages a servo-controlled motor to derive a motion signature of the diverter arm in a simple and reliable manner, obviating the need for additional equipment like the position sensor 112 and the local control unit 114 while further simplifying computational requirements.

In the present embodiment, the gearmotor 130 comprises a servo-controlled motor (servo motor), and the drive 132 comprises a servo drive, operably coupled to the servo motor 130 and powering and controlling the servo motor 130. The drive 132 can be integrated in the servo motor 130 and generally provides speed adjustments, for example for belts or other means that operate or move the diverting arm(s) 110. The actuator servo drive 132, comprises a servo controller 134, such as a servo controller, configured to adjust speeds of the servo motor 130 and thereby moving the stages (gears) of the servo motor 130 and moving the diverting arm 110.

The servo controller 134 is configured precisely control the position of the diverter arm 110 by controlling an angular position of the output shaft of the servo motor 130. The angular position of the output shaft of the servo motor 130 is controlled via a command signal generated by the servo controller 134. The command signal may comprise, for example, a current signal for controlling torque applied to the output shaft of the servo motor 130.

Figure 3:
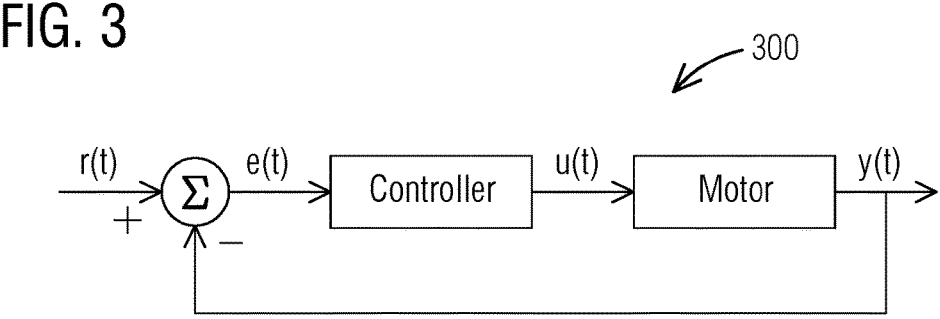
FIG. 3 illustrates an exemplary feedback control loop for a servo-controlled motor.

As illustrated in FIG. 3, the command signal is generated based on a feedback control loop 300, for example, incorporating a proportional-integral-derivative (PID) controller, to maintain a desired motion profile of the diverter arm 110. As shown, the command signal u(t) transmitted to the motor by the controller is adjusted at discrete time steps as a function of an error e(t) between a setpoint (commanded) position r(t) and an actual position y(t) of the output shaft as measured by a sensor.

Referring back to FIG. 2, the sensor may comprise, for example, a rotary encoder 202 (not visible in the shown view) affixed to a motor shaft, for example, the output shaft of the servo motor 130. Rotary encoders or shaft encoders are typically incorporated in standard servo motors, which obviates the need for additional position sensing equipment.

As previously stated, a motion signature of the diverter arm 110 is derivative of a motion sequence or course of movement from the retracted position RP to the extended position EP along path 140. In the present embodiment, a motion signature of the diverter arm 110 is derived based on a change of the command signal at discrete time steps. The motion signature of the diverter arm 110 is then evaluated to identify an abnormal operation of the diverter arm. The above steps may be performed by the main control system 150.

Figure 4:
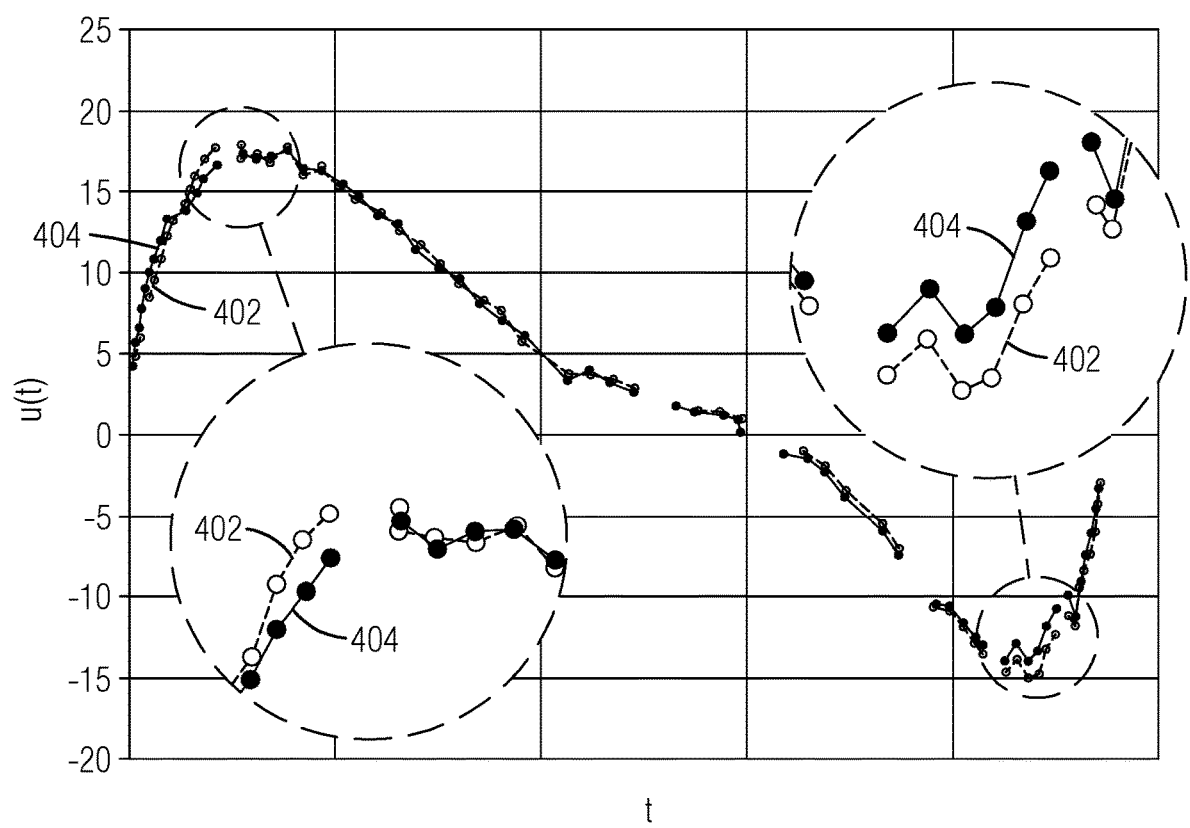
FIG. 4 illustrates an exemplary plot of command signal against time for a servo-controlled motor operating a diverter arm.

FIG. 4 illustrates an exemplary plot of command signal against time for a servo-controlled motor operating a diverter arm. In FIG. 4, two curves or waveforms are shown: a first curve 402 shows a variation of the command signal u(t) with time t for one reciprocating cycle (from the retracted dwell position to the extended swell position and back to the retracted dwell position) of a diverter arm in a test unit, while a second curve 404 shows a reference curve obtained from a healthy unit. The points plotted on each curve represent individual command signals (e.g., current for controlling motor torque) at discrete time steps. For a system operating normally (i.e., under very little wear or backlash) the resultant command signal waveform 404 is relatively smooth. For a system operating abnormally, for example, because of backlash, the error between the setpoint (commanded) position and the actual measured position tends to increase, causing the command signal waveform 402 to be less smooth.

The present embodiment is based on the inventive recognition that a motion signature of a diverter arm can be derived based on an error count in the servo-controlled motor operating the diverter arm over a defined interval. In an example, the error count may be established by a summation of command signal change over a defined interval. For example, the defined interval can correspond to one or multiple reciprocating cycles.

The command signal change at each time step is a difference between the command signal at that time step and the command signal at the previous time step. For the purpose of summation, the command signal change at each individual time step is taken as a positive value, taking into account only the magnitude of the difference (irrespective of whether the difference is positive or negative). The summation of command signal change is therefore a scalar addition of positive numerical values. Thus, instead of a comparison of the waveforms 402 and 404 to identify an abnormal operation of the test unit, the present embodiment requires a comparison of the summation of command signal change over a defined interval for the waveform 402 to the a summation of command signal change over the same interval for waveform 404, both of which constitute scalar quantities.

In one embodiment, the summation of command signal change for one or multiple healthy units may be stored as respective reference values. An abnormal operation of a test unit may be identified based on a comparison of the summation of command signal change of the test unit to one or more of the reference values. The underlying computation is therefore simplified significantly, enabling a standard controller, such as a PLC, to perform the task without additional computational hardware.

In an alternate approach, the motion signatures of the test unit and the healthy unit may be represented by the respective command signal waveforms (e.g., waveforms 402 and 404). In this case, the waveforms of one or more healthy units may be stored as reference waveforms, wherein an abnormal operation of a test unit may be identified based on a comparison of the waveform of the test unit with the waveforms of the one or more healthy units.

As in the embodiment of FIG. 1, the main control system 150 may be configured to communicate, wirelessly, the evaluated motion signatures to a remote cloud-based application 160 and/or a remote database 170 for further processing, such as remote technical support, for example recommendations as to maintenance service or automatic ordering of parts that need replacement. Storing and analyzing the motion signatures (remotely or otherwise), particularly comparing the summation of command signal change from many different diverter systems, and correlating conditions and events that have correlated to particular patterns offers potential to associate trends with very specific likely outcomes.

Those of skill in the art will recognize that not all details are shown or described in the systems shown in FIG. 1 and FIG. 2. For example, the housing or enclosure 122 may house other components of the diverter system, such as arm belts and/or other mechanical or electromechanical components 124.

The described systems 100 and 200 allow significantly more insight into the condition of the equipment and provides increased likelihood that maintenance conditions can be identified and dealt-with without allowing the system to fail during operation.

Monitoring the diverting arm(s) 110 of a diverter system, or the linkage that controls position of the diverter arm(s) in a 3-dimensional space provides and enables:
- Identifying excessive backlash in the movement of the diverting arm(s).
- Identifying incorrect motion parameters, slow speed, etc.
- Identifying incorrect timing of the divert operation, according to the contact of items on the arms 110 after they have activated.
- Identifying harmful exceptions in the course of normal operation, such as a "pinched bag," a strap or other part of a bag caught in the arms, etc.
- Identifying failure to operate at all when triggered.

While embodiments have been disclosed in exemplary forms, it will be apparent to those skilled in the art that many modifications, additions, and deletions can be made therein without departing from the spirit and scope of the disclosure and its equivalents, as set forth in the following claims.

The invention claimed is:

1. A diverter system comprising:
a diverter arm,
an actuator assembly for operating the diverter arm, the actuator assembly configured to move the diverter arm between an extended dwell position and a retracted dwell position,
a sensor for monitoring a position of the diverter arm, and
a control system configured to derive a motion signature of the diverter arm based on the positions of the diverter arm measured by the sensor, and to evaluate the motion signature of the diverter arm to identify an abnormal operation of the diverter arm,
wherein the control system is configured to compare the motion signature of the diverter arm to a previously stored reference signature of a reference diverter arm to identify an abnormal operation of the diverter arm, wherein the comparison comprises determining a degree of difference between the dwell positions of the diverter arm and reference dwell position of the reference signature.

2. The diverter system of claim 1, wherein the control system is configured to compare the motion signature of the diverter arm to one or more fixed thresholds to identify an abnormal operation of the diverter arm.

3. The diverter system of claim 1, wherein the control system is configured to communicate evaluated motion signature to a remote cloud-based application or a remote database via a wireless communication link.

4. A diverter system comprising:
a diverter arm,
an actuator assembly for operating the diverter arm, the actuator assembly configured to move the diverter arm between an extended dwell position and a retracted dwell position,
a sensor for monitoring a position of the diverter arm, and
a control system configured to derive a motion signature of the diverter arm based on the positions of the diverter arm measured by the sensor, and to evaluate the motion signature of the diverter arm to identify an abnormal operation of the diverter arm,
wherein the sensor comprises at least one accelerometer affixed to the diverter arm.

5. A diverter system comprising:

a diverter arm, an actuator assembly for operating the diverter arm, the actuator assembly configured to move the diverter arm between an extended dwell position and a retracted dwell position, a sensor for monitoring a position of the diverter arm, and a control system configured to derive a motion signature of the diverter arm based on the positions of the diverter arm measured by the sensor, and to evaluate the motion signature of the diverter arm to identify an abnormal operation of the diverter arm, wherein the actuator assembly comprises a servo-controlled motor configured to control the position of the diverter arm based a command signal that is adjusted as a function of an error between a setpoint position and an actual position measured by the sensor, wherein control system is configured to derive the motion signature of the diverter arm based on a change of the command signal at discrete time steps.

6. The diverter system of claim 5, wherein the control system is configured to determine the motion signature of the diverter arm as a summation of command signal change occurring at discrete time steps over a defined interval.

7. The diverter system of claim 6, wherein the defined interval corresponds to one or multiple reciprocating cycles of the diverter arm.

8. The diverter system of claim 6, wherein the control system is configured to compare the summation of command signal change to a reference value to identify an abnormal operation of the diverter arm.

9. The diverter system of claim 5, wherein the command signal is a current signal for controlling torque applied to a motor shaft.

10. The diverter system of claim 5, wherein the sensor comprises a rotary encoder affixed to a motor shaft.

11. A diverter system comprising:

a diverter arm, an actuator assembly comprising a servo-controlled motor for moving the diverter arm between an extended dwell position and a retracted dwell position, the servo-controlled motor configured to control the position of the diverter arm based on a command signal that is adjusted as a function of an error between a setpoint position and an actual position, and a control system configured to derive a motion signature of the diverter arm based on an error count over a defined interval and to evaluate the motion signature of the diverter arm to identify an abnormal operation of the diverter arm.

* * * * *